US008005087B2

(12) United States Patent
Dolganow et al.

(10) Patent No.: US 8,005,087 B2
(45) Date of Patent: Aug. 23, 2011

(54) APPLICATION-LEVEL PROCESSING FOR DEFAULT LTE BEARER

(75) Inventors: Andrew Dolganow, Kanata (CA); Steven Edward Morin, Ottawa (CA); Keith Allan, Kanata (CA)

(73) Assignee: Alcatel Lucent, Paris (FR)

( * ) Notice: Subject to any disclaimer, the term of this patent is extended or adjusted under 35 U.S.C. 154(b) by 149 days.

(21) Appl. No.: 12/211,616

(22) Filed: Sep. 16, 2008

(65) Prior Publication Data
US 2010/0067400 A1 Mar. 18, 2010

(51) Int. Cl.
*H04L 12/28* (2006.01)
*H04L 12/56* (2006.01)
(52) U.S. Cl. ............... 370/392; 370/412; 370/395.21
(58) Field of Classification Search ............ 370/401, 370/412–418
See application file for complete search history.

(56) References Cited

U.S. PATENT DOCUMENTS

| | | | |
|---|---|---|---|
| 6,359,861 B1 * | 3/2002 | Sui et al. | 370/230 |
| 6,570,875 B1 * | 5/2003 | Hegde | 370/389 |
| 6,633,540 B1 * | 10/2003 | Raisanen et al. | 370/230.1 |
| 6,654,374 B1 * | 11/2003 | Fawaz et al. | 370/394 |
| 6,956,818 B1 * | 10/2005 | Thodiyil | 370/230 |
| 7,457,313 B2 * | 11/2008 | Patrick | 370/468 |
| 2004/0090974 A1 * | 5/2004 | Balakrishnan et al. | 370/412 |
| 2006/0215556 A1 * | 9/2006 | Wu et al. | 370/230 |
| 2006/0233101 A1 * | 10/2006 | Luft et al. | 370/229 |
| 2007/0133419 A1 | 6/2007 | Segel | |
| 2007/0255852 A1 * | 11/2007 | McBride et al. | 709/246 |
| 2008/0089237 A1 * | 4/2008 | Molen et al. | 370/252 |
| 2009/0238071 A1 * | 9/2009 | Ray et al. | 370/235 |
| 2009/0252148 A1 * | 10/2009 | Dolganow et al. | 370/351 |
| 2009/0296702 A1 * | 12/2009 | Stevens et al. | 370/389 |
| 2010/0020686 A1 * | 1/2010 | Lee et al. | 370/231 |
| 2010/0271942 A1 * | 10/2010 | Weiss et al. | 370/230 |
| 2010/0284278 A1 * | 11/2010 | Alanara | 370/235 |

OTHER PUBLICATIONS

Awan et al., Improving the Network Transmission Cost of Differentiated Web Services, I.J. of Simulation, vol. 6, No. 3-4 p. 82-88.
Ghadialy, Z., A look at PDP Context in UMTS networks, http://www.3g4g.co.uk/Tutorial/ZG/zg_pdp.

* cited by examiner

*Primary Examiner* — Warner Wong
(74) *Attorney, Agent, or Firm* — Kramer & Amado P.C.

(57) ABSTRACT

A serving gateway facing a radio access network receives packets, applies deep packet inspect to classify the packet into a predetermined application class, and inserts a marker identifying the class and a QoS associated with the class. The serving gateway assigns the packets to a queue within a default bearer based on the class and the QoS marker. The serving gateway transfers packets through the bearer by processing the queues in accordance with their priority.

25 Claims, 4 Drawing Sheets

APPLICATION-LEVEL PROCESSING FOR DEFAULT LTE BEARER

TECHNICAL FIELD

Embodiments relate generally to packet communications within networks, including transport bearer management.

BACKGROUND

The volume of data associated with wireless user equipment and wireless networks is continually increasing. Reasons include the increasing variety of user equipment (e.g., ultra-mobile laptops, personal digital assistants (PDAs)), and the broadening variety of web services, particularly high bandwidth services. As an illustration, vehicle on-board computer systems, having access to various subscription-based information and entertainment services, such as movies, are becoming commonplace.

One goal of wireless systems, from the perspective of both users and providers, is global mobility, meaning reliable, secure connections across all geographical areas to uninterrupted services such as e-mail, web browsing, virtual office networking, publish-subscribe systems, telephony communications, and various web business services. Related goals are fair and efficient allocation of bandwidth and accurate monitoring of use to enable accurate and flexible billing for services provided.

The Universal Mobile Telecommunication System (UMTS), developed under the Third Generation Partnership Project (3G) cellular network standard, was developed in view of these and other goals.

An improvement of the UMTS 3G system, termed the Long Term Evolution (LTE) next generation system, is foreseen as a next significant step towards these and other goals, namely global mobile service for the user and accurate monitoring, billing, control, and maintenance of communication traffic. LTE is also seen as helping to meet anticipated bandwidth requirements of likely increases in use of services such as, for example, Multimedia Online Gaming (MMOG), mobile TV, mobile podcasting, and other various streaming media.

LTE is an all-packet system, currently referred to in the industry as the Evolved Packet System (EPS). Its specification is sufficiently established such that various significant efforts toward large-scale commercial deployment are underway.

LTE was developed in view of an ongoing market shift toward all-IP mobile access systems, to provide capacity, reliability, scalability, and added revenue generation models and options, including quality of service (QoS) based packet prioritization and billing.

The LTE specification is well known, and readily accessible to the public. For purposes of convenience and background, the 3GPP LTE Specification, Release 8, available from 3GPP, is hereby incorporated by reference.

LTE will likely provide significant improvements over UMTS in terms of bandwidth, mobility, revenue, scalability, flexibility, inter-operability, and other parameters. However, LTE was developed to meet a very broad range of requirements. For example, one LTE objective is a flat IP network architecture, and its specifications and functions are further to this objective. The present inventors have identified potential limitations and shortcomings.

One such limitation relates to assignment of default bearers. When a communication is initiated in an LTE system, an attachment process assigns bearers to the communication. First, a default bearer without a Guaranteed Bandwidth Rate (GBR) is established for signaling traffic with the user's base station (e.g., between the eNodeB and the serving or "S-GW" facing the eNodeB) and any non-GBR traffic, like "best-effort" data. In addition, a dedicated bearer with a GBR specific to the application (e.g., voice call) may be set-up if required by the user. Since only dedicated bearers have guaranteed QoS, they have priority over the default bearers. Therefore, when congestion occurs, traffic carried in default bearers for UE on S-GW will likely be buffered or discarded, depending on the amount of traffic allowed and offered on the dedicated bearers. As a result, various applications that may use default bearer, including signaling, may be negatively impacted, to an extent including failure.

It has been proposed, for overcoming the potential of dedicated bearer traffic impacting default bearer traffic, to provide a different dedicated bearer for each application or group of applications (e.g., voice, video, MMS). However, such an arrangement requires numerous bearers and related resources at the S-GW and MME and, further, may result in substantial overhead.

In addition, charging/credit policy may be required against a default bearer in the S-GW. Mixing different applications and signaling traffic, however, may result in errors in the above and would not allow per-application level charging/credit/policy.

There are existing mechanisms such as, for example, differential services control point (DSCP) marking for differential services (DiffServ), directed to providing QoS priority and application differentiation in IP networks. However, DiffServ is only a packet-loss prioritization, in which IP packets are marked with one of three (3) drop precedence values, the lower the value the higher the priority of not dropping the packet. Such mechanisms can be acceptable for well-controlled application/services, but fall short for over-the-top (OTT) applications classified as part of the default bearer traffic, such as OTT Voice Over IP (VoIP) data like Skype or partner content delivered over the Internet.

SUMMARY

The present invention and its various exemplary embodiments provide, among other features and benefits, a significant reduction in the number of dedicated bearers created for concurrent packet communications through radio networks. Furthermore, various exemplary embodiments provide a novel assignment of multiple of applications to a default bearer and a QoS-based priority transmission that allows prioritization of applications within a user's default bearer, among all default bearers, and among all traffic offered through a common default and dedicated bearer scheduling.

Various exemplary embodiments provide these and other features and benefits by employing, in various combinations with other aspects, deep packet inspection (DPI) to identify the packet or Service Data Flow (SDF) application class, mark the packet to identify the application class and associated QoS parameters, assign the marked packets to default bearers or other queues based on the QoS of the default bearers and the QoS of the application class, and perform per-packet QoS transmission of concurrent packets through a single communication link.

According to one aspect, per-packet QoS transmission of concurrent different packets through single communication link includes creating multiple queues for the default bearer applications for each concurrent packet, loading the queues with the DPI-marked packets, the marking including QoS parameters associated with the DPI-identified application class, and scheduling transmissions from the queues through the communication link both as part of and outside of a common default bearer scheduling based on the queues' respective marked QoS parameters.

According to one aspect, the marking of packets with QoS parameters associated with the packet's DPI-identified application class includes marking of the packets with a QoS-based forwarding control data.

According to one aspect, the DPI-based identification of the packet's application class includes identifying whether the packet is an over-the-top (OTT) application and, in response to the identifying, marking the packet as a given OTT class. The DPI-based identification of the class may further include, in response to the marking, assigning the packet a default bearer class meeting a given QoS associated with the given OTT class, and assigning the SDF to a queue within the default bearer having parameters required to deliver Quality of Experience (QoE) for a given application or application class, such as a real-time priority queue, best-effort priority queue, or scavenger priority queue.

According to one aspect, the DPI-based identification of the packet's application class includes identifying whether the packet is signaling traffic for, among others, establishment, modification, release, or handover of SDF resources in a mobile network, marking the signaling packet as a given signaling class. The DPI-based identification may further include, in response to the marking, assigning the packet a default bearer meeting a given QoS associated with the given signaling class, and assigning the SDF to a queue within the communication link part or outside of default bearer scheduling having a priority required to ensure correct signaling behavior in the mobile network.

According to one or more of the various exemplary embodiments, the DPI application class identification and packet marking, based on the identified application class and a given QoS parameter associated with the application, is performed at a network edge node such as, for example, a serving gateway facing a radio network user equipment.

According to another of the various exemplary embodiments, the DPI application class identification and packet marking based on the identified application class and a given QoS parameter associated with the application is performed at a network edge node such as, for example, a PDN-Gateway facing a packet data network (PDN), and an assigning the marked packets to default bearer classes based on the QoS of the default bearers and the QoS of the application class either at the PDN-Gateway or downstream at another network node, for example the S-GW, and a per-SDF QoS transmission of concurrent different packets, through a single communication link is performed at a network edge node facing a user radio equipment.

DESCRIPTION

Figure 1:
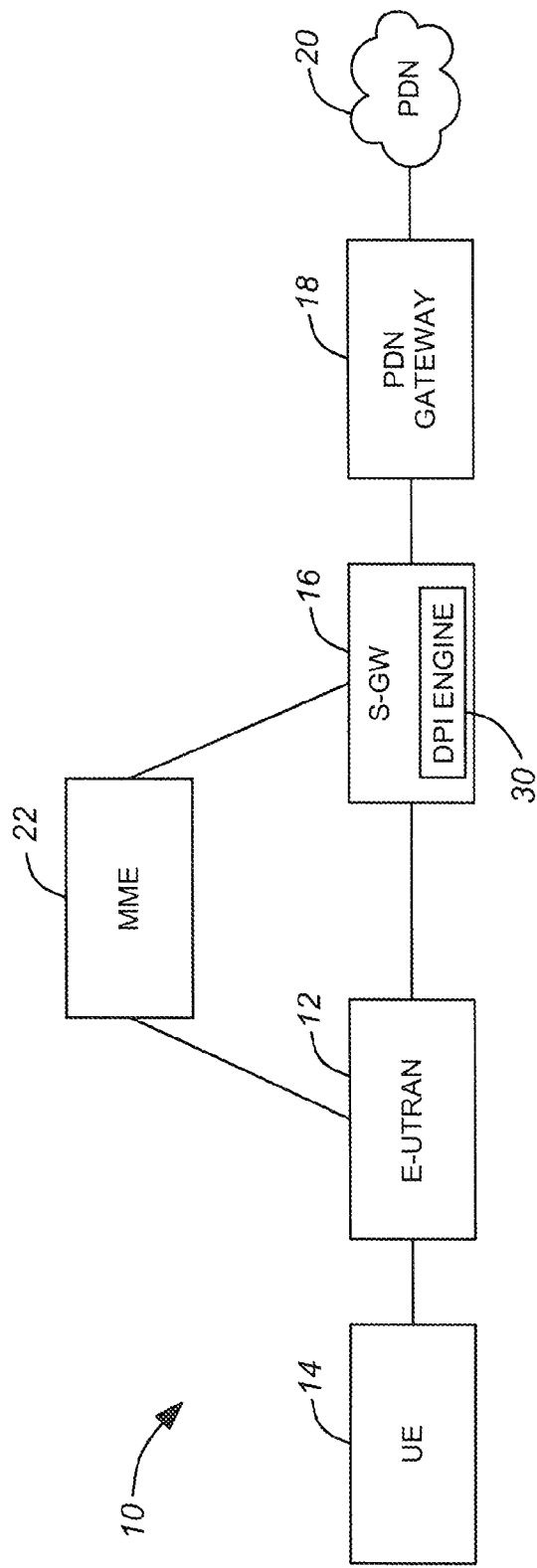
FIG. 1 shows one example system according to various exemplary embodiments, the system including a serving gateway with DPI-based, per-packet QoS transmission through single bearers.

The following describes exemplary embodiments and aspects of the invention sufficient to enable persons of skill in the relevant art to practice the invention according to the best mode contemplated by the present inventors.

The description is in reference to accompanying drawings, which form a part of this description. It should be apparent that the particular examples are only for illustrative purposes and the invention is not limited to the specific examples described herein and/or depicted by the attached drawings. Other configurations and arrangements can, upon reading this description, be readily recognized and implemented by persons skilled in the relevant arts.

To avoid obscuring novel features and aspects, the following description omits various details of methods and techniques known to persons skilled in the relevant arts that, when combined with this disclosure, such persons may readily select and employ to practice according to the embodiments.

Various embodiments and aspects may be described separately or as having certain differences. Separate description, however, does not necessarily mean the embodiments or aspects are mutually exclusive. For example, a particular feature, function, or characteristic described in relation to one embodiment may be included in other embodiments.

In the drawings, like numerals appearing in different drawings, either of the same or different embodiments of the invention, reference functional blocks or system blocks that are, or may be, identical or substantially identical between the different drawings.

The term "engine," as used herein, means any data processing machine capable of accepting and processing an input and/or performing operations based on the input to generate an output in accordance with the function recited for the engine.

The term "data processing machine" includes, but is not limited to, a general purpose programmable computer or computing resource having, for example, one or more data processor cores capable of reading or otherwise receiving machine-executable instructions that, when executed by the processor core, affect a state machine and/or perform other operations to carry out the function recited.

FIG. 1 depicts a functional diagram of one illustrative system 10 according to various exemplary embodiments.

For purposes of illustration and for facilitating an understanding of the inventive concepts, particular aspects and features of example system 10 are described with reference to the Long Term Evolution (LTE) functional specification.

Description with reference to LTE, however, is only for purposes of assisting in an understanding of the invention. As will be readily apparent to persons skilled in the relevant arts based on this disclosure, the invention and its various embodiments may be practiced on various alternative packet networks.

Referring now to FIG. 1, the example system 10 includes one or more radio access network base stations 12 that may be, for example, Evolved Universal Terrestrial Radio Access Network (E-UTRAN) subsystems, having, for example, at one least enhanced NodeB (eNodeB) according to the LTE specification.

With continuing reference to FIG. 1, the base station 12 communicates with one or more user equipments (UEs) 14. The UEs 14 may be, for example, any user device capable of communicating with an eNodeB or equivalent type of base station 12. Illustrative examples of UE 14 include, without limitation, a cellular telephone, PDA, laptop computer, and vehicle-mounted computer with appropriate wireless features.

The UEs 14 and the base station 12 may communicate using, for example, Orthogonal Frequency Divisional Multiplexing (OFDM) as a downlink (DL) transmission scheme and a single-carrier transmission (e.g., Single Carrier-Frequency Division Multiple Access (SC-FDMA)) uplink (UL) scheme. These example configurations for the base station 12 and UEs 14 are only illustrations. Alternatives will be apparent to persons skilled in the relevant arts. Based on this disclosure, such persons will readily understand that the configuration of the base station 12 and the UEs 14 is not necessarily particularized to the practice of this invention.

Referring to FIG. 1, the example system 10 includes a serving gateway, termed the DPI/QoS S-GW 16, facing the base station 12. DPI/QoS S-GW 16 may be arranged to perform DPI classification of packets into application classes, assignment of packets to default bearer queues (serviced inside or outside of a common default bearer processing) based on the identified classification, and per-packet QoS transmission of multiple packets, through single communication links, to the base station 12. The DPI/QoS S-GW 16 may connect to a packet data network gateway, PDN-GW 18. The PDN-GW 18 may connect to a packet data network (PDN) 20 such as, for example, the Internet. The example system 10 may further include a Mobile Management Entity (MME) 22 to perform LTE or equivalent functions such as, for example, authenticating users, assigning temporary identification to UEs 14, and controlling hand-off of a UE 14 from one base station 12 (e.g., eNodeB) to another base station (e.g., to another eNodeB, not specifically shown in FIG. 1).

It will be understood that the example system 10 depicts only the portions of an LTE or equivalent system that directly pertain to the various exemplary embodiments and to the illustrative operations described herein. Additional functions and functional blocks may be included such as, without limitation, any of the various functions defined by the LTE specification. For example, for compatibility with 3G user equipment, system 10 may include a 3G specification UTRAN and GERAN (not shown in FIG. 1), or equivalent, connecting to a corresponding gateway services node (GSN) (not shown in FIG. 1) and to the DPI/QoS S-GW 16. A GSN, if included, may be connected to the DPI/QoS S-GW 16 and to the MME 22, to accommodate legacy 3G UEs.

Further, as another illustrative example, system 10 may include an LTE specification HSS (not shown in FIG. 1) connected to the MME 22 per the LTE specification TS 23.402. In addition, system 10 may include an LTE specification system policy and charging rules (PCRF) (not shown in FIG. 1), or equivalent, connected to the PDN-GW 18, for providing transfer of QoS policy and charging rules from PCRF to Policy and Charging Enforcement Point (PCEF) in the DPI/QoS S-GW 16.

With continuing reference to FIG. 1, the DPI/QoS S-GW 16 preferably includes a deep packet inspection application classification and marking engine (DPI) 30. It should be apparent that although illustrated as an integrated component of DPI/QoS S-GW 16, DPI engine 30 may be located behind (downstream of) S-GW 16, either as a standalone appliance or part of PDN-GW 18. Alternatively, a DPI engine 30 may be included in both S-GW 16 and PDN-GW 18. In embodiments in which DPI engine 30 is not part of S-GW 16, the application-based marking described in further detail below is communicated to the S-GW 16 using packet-based marking in a manner such that S-GW 16 may analyze the packet to identify the application without the need to perform DPI processing.

DPI engine 30 is preferably arranged to inspect packets received from or destined toward the base station 12, to classify the application associated with the packet and to mark the packet based on the classification. For purposes of description, the given plurality of application classes may be identified as $AppClass_i$, i=1 to M, where M is a positive integer. Each application may have its own dedicated class or, alternatively, several applications requiring similar QoS treatment may share a class.

The DPI engine 30 may be arranged to perform the DPI classification by a shallow packet inspection having, for example, a 5-tuple user/application identifier information, and a "deep" examination of information contained in one or more of OSI layers "2" through "7." Based on this examination, DPI engine 30 may extract application information from the packet required to identify the application and the context of the packet and, if required, a plurality of IP packet flows defining the application. For example, packets received at the DPI/QoS S-GW 16 from the base station 12, assuming the system complies with the LTE specifications, are GTP-U or equivalent packets, having seven layers, with each layer including a different set of information. Methods and techniques for using DPI to extract payload information from an OSI packet and to identify an associated application based on the extraction are known to persons skilled in the relevant art. Therefore, further details are not necessary to recite here for such persons to practice the present invention.

The DPI engine 30 may be arranged to mark the packets to include an identifier of the application class, $AppClass_i$. The marking added to the packet may, for purposes of description, be referenced as $Mark(AppClass_i)$.

The DPI engine 30 may be arranged to mark the packets with at least one QoS parameter associated with the $AppClass_i$. These marked QoS parameters may be one or more QoS parameters that a bearer must meet to acceptably communicate packets from applications within the $AppClass_i$. The set of one or more QoS parameters may be represented as $QoS(AppClass_i)$, Example of $QoS(AppClass_i)$ include, but are not limited to, traffic class, traffic handling priority, transfer delay, transfer delay variation, residual bit error rate (BER), and SDU error ratio. The $QoS(AppClass_i)$ sets may be stored in the DPI engine 30 as a table, mapping each $AppClass_i$ to a corresponding set.

DPI engine 30 may mark the packets to include all QoS parameters in the set $QoS(AppClass_i)$, or a subset of the $QoS(AppClass_i)$, or another parameter value based on one or more of the set $QoS(AppClass_i)$. For purposes of description, the marking added to the packet may be referenced as $Mark(QoS(AppClass_i))$.

DPI engine 30 may be arranged to mark the packets with $Mark(AppClass_i)$ and $Mark(QoS(AppClass_i))$ by inserting the marking into a header field of the packet. As one illustrative example, assuming the packets have IPv4 datagram form, $Mark((AppClass_i)$ and $QoS(AppClass_i))$ may be inserted into selected bits of the Type of Service (TOS) field of the IPv4 datagram or, as one alternative, if the packets are in IPv6 datagram form, may be inserted into the Traffic Class field specified by IPv6. These are only illustrative examples, as various alternatives will be apparent to persons skilled in the relevant arts based on this disclosure.

DPI/QoS S-GW 16 is preferably arranged to assign the packets or SDF flows marked by the DPI engine 30 to a particular default bearer queue associated with a mobile user that is part of the communication exchange. The assignment may be performed based on the application classification and the QoS parameters marked in the packet or SDF header. Preferably, the DPI/QoS S-GW 16 is arranged to assign packets to a default bearer queue having QoS characteristics meeting the QoS requirements of the packet's marked application class and QoS parameters, i.e., its Mark(AppClass$_i$) and Mark(QoS(AppClass$_i$)). Preferably, the DPI/QoS S-GW 16 is arranged to perform per-packet QoS-based transmission of packets assigned to default bearers by processing queues in a hierarchical fashion.

Thus, for example, as described further below with reference to FIG. 3, DPI/QoS S-GW 16 may first process signaling queues outside of default bearer processing. DPI/QoS S-GW 16 may then process remaining default bearer traffic through processing of a real-time queue, best effort queue, and, finally, a scavenger or lowest priority queue. It should be apparent that, according to this arrangement, DPI/QoS S-GW 16 schedules signaling packets first, before or concurrently with packets assigned to dedicated bearer queues. Thus, DPI/QoS S-GW 16 processes common default bearer scheduling packets only after signaling packets are scheduled, starting with packets assigned to the real-time queue.

According to one aspect, the DPI/QoS S-GW 16 may be arranged to establish, for instances of R different packets assigned to the same default bearer, a plurality of R queues, one for each packet or application within the communication link. Each queue may be assigned a transmission priority, or weighting, based on the Mark(QoS(AppClass$_i$)) of the packet. The DPI/QoS S-GW 16 may be arranged to pull and transmit data from each of the queues through the common communication link based on the assigned transmission priority, thereby providing per-SDF QoS of concurrent different packets through the same communication link.

Figure 2:
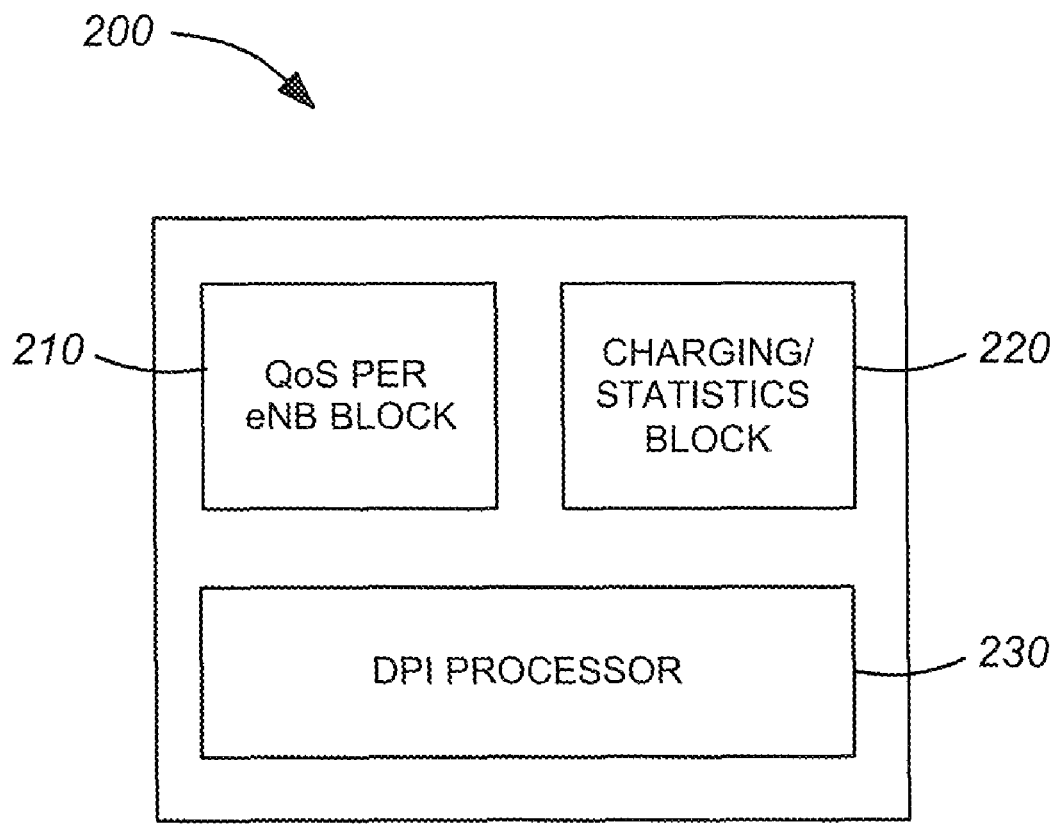
FIG. 2 shows one example serving gateway having a DPI engine and a per-packet QoS engine for assignment of default bearers and QoS-based hierarchical queuing of multiple packets through single bearers.

FIG. 2 shows a more detailed example serving gateway 200 that may implement the DPI/QoS S-GW 16, hereinafter referenced as the DPI/QoS S-GW 200, having a DPI processor 230 that may implement the DPI engine 30 described above, and a "per eNB QoS" block 210 performing bearer assignment and per-SDF QoS transmission functions described in greater detail in sections below. The DPI/QoS S-GW 200 may include a charging statistics block 220, performing various charging functions also described in greater detail in sections below.

The eNB QoS block 210 of the DPI/QoS S-GW 200 may be arranged to assign a packet to a particular application queue from the plurality of queues available for the particular user's default bearer traffic based on the application identification and the required QoS for that application. The eNB QoS block 210 of the DPI/QoS S-GW 200 may be arranged to perform the assigning based, for example, on an inspection of the Mark(QoS(AppClass$_i$)) marker field of the packet.

The eNB QoS block 210 of the DPI/QoS S-GW 200 may be further arranged to mark the packets with a Forwarding Class (FC) value, based on the Mark(QoS(AppClass$_i$)). The FC value may include, be a field of, or may supplement the Mark(QoS(AppClass$_i$)).

Referring to FIG. 2, the eNB QoS block 210 or the DPI processor 230 may be arranged to mark packets to indicate non-default bearer processing and, further, to mark the packets with a QoS data for transmission outside a common default bearer scheduling but interleaved with dedicated bearer scheduling for the communication link.

With continuing reference to FIG. 2, the eNB QoS block 210 of the DPI/QoS S-GW 200 may be arranged to establish, for instances of R different packets assigned to the same bearer, a plurality of R queues, one for each packet. Each of the R queues may be assigned a transmission priority, or weighting, based on the Mark(QoS(AppClass$_i$)) and/or based on the FC value of the packet. The transmission priority or weighting may be the FC data. The eNB QoS block 210 of the DPI/QoS S-GW 200 may be arranged to pull and transmit data from each of the queues through the communication link as part of the common default bearer scheduling or outside of it based on the assigned transmission priority (e.g. the FC value), thereby providing per-application QoS of concurrent, different applications through the same default bearer SDF. The queues may be arranged in an hierarchical manner to better ensure that all QoS parameters are optimally met.

Figure 3:
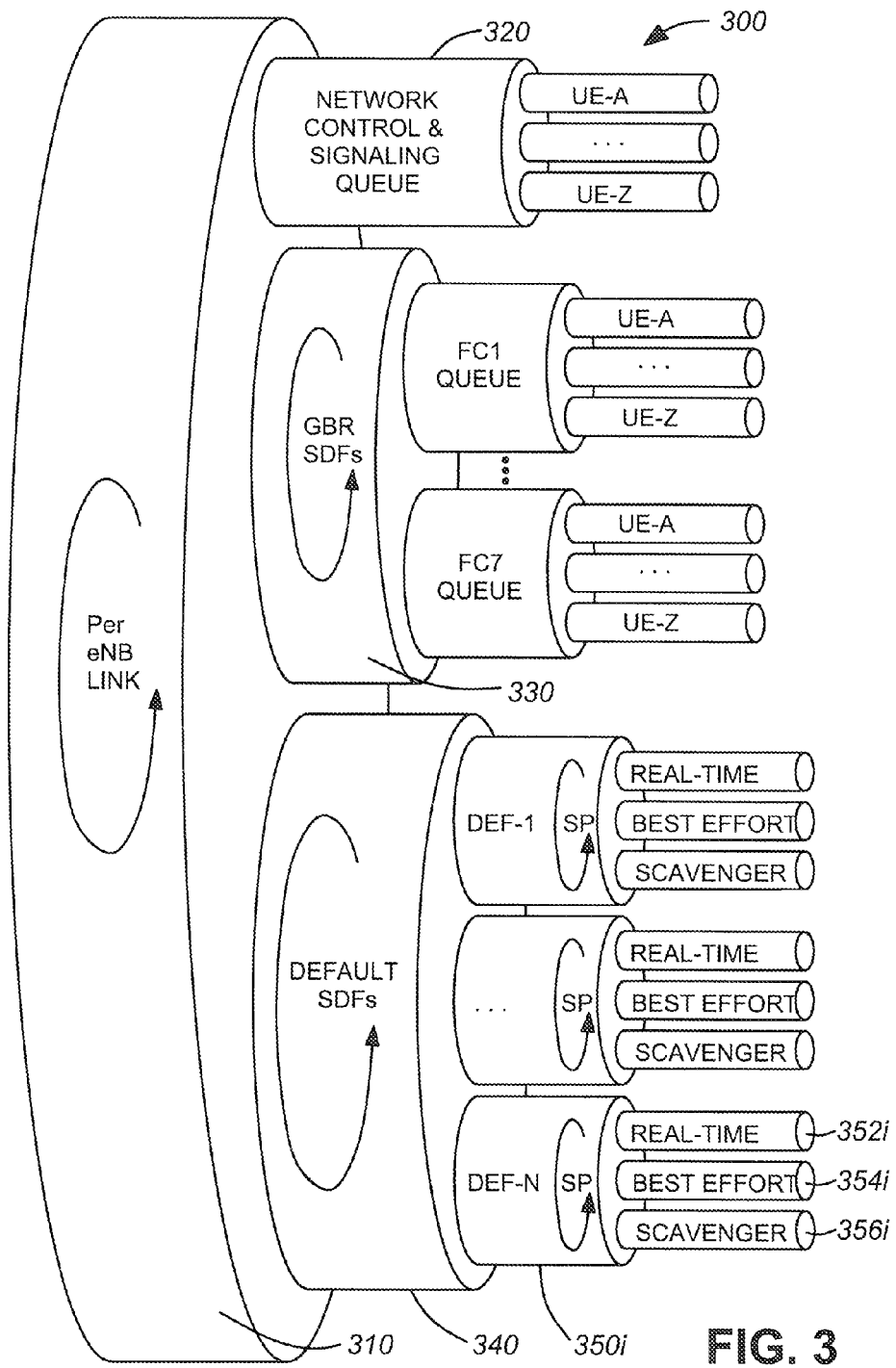
FIG. 3 shows one example DPI-based per packet QoS transmission hierarchical queuing arrangement through single bearers according to various exemplary embodiments.

FIG. 3 shows one example DPI-based per-packet QoS hierarchical transmission queuing arrangement 300 through single communication link according to various exemplary embodiments. The arrangement 300 may be implemented on a system according to FIGS. 1 and 2, or an equivalent thereof.

Referring to FIG. 3, the "per eNB link" 310 represents the FIG. 1 communication link between the base station 12 and the DPI/QoS S-GW 16. The link 310 may use, for example, a GTP-U protocol defined under the 3G LTE standard.

Referring to FIG. 3, reference numeral 320 represents the Network Control and Signaling queue, transferring data to Z different UE units, labeled UE$_i$, i=1 to Z. For each default bearer the network control and signaling feed 320 represents one or more packets or network control, signaling applications, each assigned to the same feed based on packet marking and optional DPI classification. It should be apparent that other feeds are possible for other applications, for example OTT VoIP like Skype, that are carried within default bearer SDFs but need to be processed into a communication link outside of the common default bearer processing to guarantee QoE for the application.

With continuing reference to FIG. 3, the aggregated guaranteed bit rate (GBR) SDFs 330 comprise, in the example, seven queues, labeled "FC1" through "FC7", each corresponding to a Forwarding Class inserted using conventional GBR Forwarding Code marking. In the depicted example, each of the seven queues comprising the GBR SDFs 330 comprises Z sub-queues, each corresponding to one of the Z UEs. The queues 330 are not necessarily particularized to the present invention and, accordingly, further detail is omitted.

With continuing reference to FIG. 3, the example arrangement 300 includes aggregated default non-guaranteed bit rate (NGBR) SDFs 340, comprising a non-signaling default bearer traffic associated with each UE. Each of the default bearers of 350*i* has "real time," "best effort," and "scavenger" feeds, representing three priority levels, from highest to lowest processed within the common default bearer. It should be apparent that other feeds are possible, such as instant messaging, MMS, etc. In operation, the eNB QoS block 210, using Mark(AppClass$_i$)) and Mark(QoS(AppClass$_i$)), assigns the packet to one of these feeds having a QoS meeting the QoS requirement of the identified OTT application.

For each default bearer, the real time feed 352*i* represents one or more packets or applications, each assigned to the same default bearer feed based on a DPI classification of, for example, an OTT application such as voice-over-IP (VOIP) that cannot tolerate "best effort" transmission, and having a QoS requirement met by the particular default carrier 350*i*. Referring to FIG. 2, each real time feed 352*i* is assigned based on, for example, the DPI processor 230 identifying the packet as, for example, an OTT or other application that is best communicated as real time data, and marking the packet with Mark(AppClass$_i$)) and Mark(QoS(AppClass$_i$)).

With continuing reference to FIG. 3, each best effort feed 354i of each of the default bearers represents one or more queues created by the eNB QoS block 210, with one queue for each of the different packets/applications assigned to the same "best-effort" default bearer QoS class. Furthermore, each scavenger feed 356i of the default bearers represents a feed with a priority lower than that of the best effort feeds 354i.

Referring to FIG. 3, one example hierarchy of per-packet transmission performed in accordance with arrangement 300 is as follows. Network controlling signals arriving on a default bearer have the highest priority. The eNB QoS block 210 may be arranged to apply, to Network Control signals, a Weighted Round Robin (WRR), limited to, for example, approximately ten percent per cent per base station, and may be required to release guaranteed bearers under congestion in order to return to non-congested GBR state. The GBR bearers 330 may be transmitted using per forwarding class (FC) queuing, and per FC WRR Scheduling. Preferably, a Connection Admission Control (CAC) prevents overbooking and potential congestion on a down link, other than down link bandwidth reduction (i.e. due to link failure).

Figure 4:
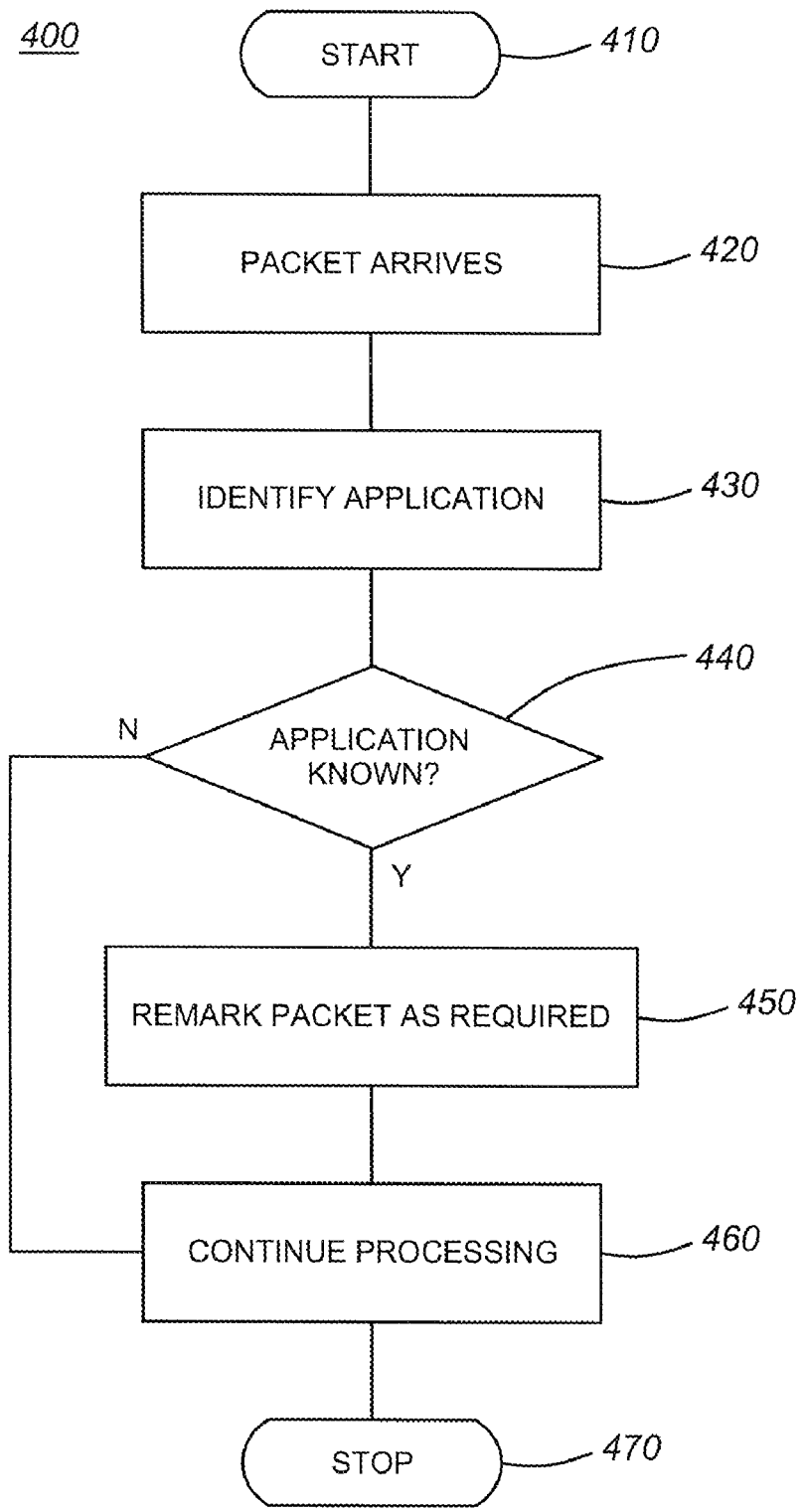
FIG. 4 shows one process flow chart representing an example DPI packet marking according to various exemplary embodiments.

FIG. 4 shows one process flow chart representing an example DPI packet marking 400 according to various exemplary embodiments, such as performed by the DPI engine 30 or the DPI processor 230 described above in reference to FIGS. 1 and 2.

Referring now to FIG. 4, the process 400 starts at 410 and waits for the next packet to arrive. At 420, the next packet arrives, whereupon at 430 the process applies DPI to identify the application or application class of the packet. Next, at 440 the process identifies whether or not the application identified at 430 is from a known class. If the answer is "yes," the process goes to 450, identifies an application class, such as AppClass$_i$ and a QoS parameter associated with the class, such as QoS(AppClass$_i$), and then marks, or remarks the packet with, for example, Mark(AppClass$_i$)) and Mark(QoS (AppClass$_i$)). The process then goes to 460 completes any related operations, and then to 470 and stops.

With continuing reference to FIG. 4, if at 440 the answer is "no" then, the process does not perform 550 and, instead, goes to 460 and then stops at 470.

Numerous benefits of the invention and its various embodiments will be apparent to persons skilled in the relevant arts. One illustrative example includes, but is not limited to, utilizing DPI to maximize efficiency on the default bearer, thus reducing the need for dedicated bearers and providing for greater scaling because the number of bearers per user equipment (UE) drops.

Another illustrative example benefit includes, but is not limited to, providing for DPI-based classification of a multitude of applications into a default bearer towards the user equipment (e.g. UE 14) at the serving gateway (e.g. DPI/QoS S-GW 16).

Another illustrative example includes, but is not limited to, use of DPI classification (e.g., DSCP remark, FC remark, discard priority remark) in conjunction with QoS processing towards the eNB (e.g., base station 12) to provide proper buffering/discards/application policy inside a default bearer SDF through application or class of application feeds.

Another illustrative example includes, but is not limited to, use of DPI classification (e.g., DSCP remark, FC remark, discard priority remark) in conjunction with QoS processing towards the eNB (e.g., base station 12), to provide proper buffering/discards/application policy including default bearer SDF processing and promotion of signaling traffic above default SDF and some or all BGR SDF scheduling.

Another illustrative example benefit includes, but is not limited to, use of DPI classification to provide per application charging, including zero-rate charging when traffic like signaling has to be extracted from total traffic sent over the default bearer. Referring to FIG. 2, the example DPI/QoS S-GW 200 includes a charging statistics block 220 to exploit this benefit.

Referring to FIG. 1 the example system 10 shows the DPI engine 30 within the DPI/QoS S-GW 16 and, likewise, FIG. 2 shows the DPI processor 230 within the DPI/QoS S-GW 200. The DPI functions of classifying the SDF application, and marking the packet may, as one alternative, be performed in the PDN-GW 18, with the DPI/QoS S-GW 16 being arranged to perform the above-described assignment of default bearers and per-packet QoS transmission of different packets through the same default bearers. Alternatively, the DPI processing may be performed in a dedicated router, such that the DPI processing is performed in neither the S-GW nor PDN-GW.

There may be various processing resource issues as to where the DPI operations are performed. A further consideration is that performing the DPI-based application classification and QoS marking in the DPI/QoS S-GW 16 or 200 allows internal packet marking that only the DPI/QoS S-GW 16 would understand while, in contrast, if the DPI operations are performed on the PDN-GW 18, the marking must be performed in a manner compatible with the PDN-GW 18.

While certain embodiments and features of the invention have been illustrated and described herein, many modifications, substitutions, changes, and equivalents will occur to those of ordinary skill in the art, and the appended claims cover all such modifications and changes as fall within the spirit of the invention.

We hereby claim:

1. A method of transmitting packets in a wireless communications system, the method comprising:
   maintaining a default bearer across a communication link in a radio network for a user equipment device, the default bearer including a plurality of queues and carrying only packets associated with the user equipment device, each queue within the default bearer providing a given QoS across the communication link;
   receiving a packet for transfer across the communication link;
   performing Deep Packet Inspection (DPI) classification on the packet to identify an application class associated with the packet;
   associating, with the packet, an application identifier corresponding to the application class and a Quality of Service (QoS) parameter corresponding to a QoS required for the application class;
   assigning the packet to an outgoing queue that satisfies the QoS parameter;
   processing the outgoing queue for transmission of the packet over the radio network to the user equipment device; and
   if necessary, establishing at least one additional bearer for the user equipment device.

2. The method of transmitting packets of claim 1, wherein the communication link comprises at least one queue outside the default bearer and wherein the outgoing queue is selected from the plurality of queues within the default bearer.

3. The method of transmitting packets of claim 2, wherein the step of processing the plurality of queues is performed in a hierarchical fashion.

4. The method of transmitting packets of claim 3, wherein the plurality of queues included in the default bearer comprise a real-time queue, a best effort queue, and a scavenger queue.

5. The method of transmitting packets of claim 4, wherein the real-time queue is processed first, the best effort queue is processed second, and the scavenger queue is processed third.

6. The method of transmitting packets of claim 1, wherein the outgoing queue is a queue serviced prior to the plurality of queues in the default bearer and prior to or concurrently with guaranteed bandwidth rate (GBR) bearer queues.

7. The method of transmitting packets of claim 6, wherein the outgoing queue is a network control and signaling queue that processes signaling traffic.

8. The method of transmitting packets of claim 1, wherein the application identifier and the QoS parameter are placed in a header field of the packet.

9. The method of transmitting packets of claim 1, wherein multiple applications belong to each application class.

10. A communication system for packet communications, the system comprising:
    a user equipment device operated by a user;
    a radio network in wireless communication with the user equipment device; a DPI-based packet application classifier adapted to:
    receive a packet,
    identify the packet's application class using deep packet inspection, and
    associate, with the packet, an application identifier corresponding to the application class and a Quality of Service (QoS) parameter corresponding to a QoS required for the application class; and
    a serving gateway adapted to:
    maintain a default bearer across a communication link in the radio network for the user equipment device among a plurality of user equipment devices, the default bearer including a plurality of queues and carrying only packets associated with the user equipment device, and each queue within the default bearer providing a given QoS across the communication link,
    receive the application identifier and the QoS parameter from the DPI-based application classifier,
    assign the packet to an outgoing queue that satisfies the QoS parameter,
    process the outgoing queue for transmission of the packet over the communication link to the user equipment device; and
    if necessary, establishing at least one additional bearer for the user equipment device.

11. The communication system of claim 10, wherein the serving gateway establishes at least one queue outside the default bearer and wherein the serving gateway selects the outgoing queue from the plurality of queues within the default bearer.

12. The communication system of claim 11, wherein the serving gateway processes the plurality of queues in a hierarchical fashion.

13. The communication system of claim 12, wherein the plurality of queues within the default bearer comprise a real-time queue, a best effort queue, and a scavenger queue.

14. The communication system of claim 13, wherein the serving gateway processes the real-time queue first, the best effort queue second, and the scavenger queue third.

15. The communication system of claim 10, wherein the outgoing queue selected by the serving gateway is a queue serviced prior to the plurality of queues in the default bearer and prior to or concurrently with guaranteed bandwidth rate (GBR) queues.

16. The communication system of claim 15, wherein the outgoing queue is a network control and signaling queue that processes signaling traffic.

17. The communication system of claim 10, wherein the DPI-based application classifier places the application identifier and the QoS parameter in a header field of the packet.

18. The communication system of claim 10, wherein the DPI-based application classifier is a standalone processor.

19. The communication system of claim 10, wherein the DPI-based application classifier is integrated into the serving gateway.

20. The communication system of claim 10, wherein the DPI-based application classifier is integrated into a packet data network gateway.

21. The method of claim 1 wherein the default bearer carries packet traffic between a packet data traffic network gateway and the user equipment device.

22. The communication system of claim 10 wherein the default bearer carries packet traffic between a packet data network gateway and the user equipment device.

23. A method of transmitting packets in a wireless communications system, the method comprising:
    maintaining a default bearer across a communication link, the default bearer terminating at a user equipment device and a packet network gateway, the default bearer including a plurality of queues at a node of the communication link, each queue within the default bearer providing a given QoS across the communication link, wherein the default bearer carries only packets associated with the user equipment device;
    receiving at e-the node of the radio communication link, a packet for transfer across the communication link;
    performing Deep Packet Inspection (DPI) classification on the packet to identify an application class associated with the packet;
    associating, with the packet, an application identifier corresponding to the application class and a Quality of Service (QoS) parameter corresponding to a QoS required for the application class;
    assigning the packet to an outgoing queue that satisfies the QoS parameter;
    processing the outgoing queue for transmission of the packet through the base station to the user equipment device; and
    if necessary, establishing at least one additional bearer for the user equipment device.

24. The method of claim 23 wherein the node of the radio communication link is a serving gateway.

25. A method of transmitting packets in a wireless communications system, the method comprising:
    maintaining a default bearer across a communication link in a radio network for a user equipment device, among a plurality of user equipment devices, the default bearer including a plurality of queues, each queue within the default bearer providing a given QoS across the communication link wherein the default bearer carries only packets associated with the user equipment device;
    receiving a packet for transfer across the communication link;
    performing Deep Packet Inspection (DPI) classification on the packet to identify an application class associated with the packet;

associating, with the packet, an application identifier corresponding to the application class and a Quality of Service (QoS) parameter corresponding to a QoS required for the application class;
assigning the packet to an outgoing queue that satisfies the QoS parameter;
processing the outgoing queue for transmission of the packet over the radio network to the user equipment device, wherein the outgoing queue is a queue serviced prior to the plurality of queues in the default bearer and prior to or concurrently with guaranteed bandwidth rate (GBR) bearer queues; and
if necessary, establishing at least one additional bearer for the user equipment device.

* * * * *